SILAS C. NICHOLS.
Improvement in Fur Boxes.

No. 119,168. Patented Sep. 19, 1871.

UNITED STATES PATENT OFFICE.

SILAS C. NICHOLS, OF BUFFALO, NEW YORK, ASSIGNOR OF ONE-HALF HIS RIGHT TO CHARLES N. TYLER, OF SAME PLACE.

IMPROVEMENT IN FUR-BOXES.

Specification forming part of Letters Patent No. 119,168, dated September 19, 1871.

*To all whom it may concern:*

Be it known that I, SILAS C. NICHOLS, of Buffalo, in the county of Erie and State of New York, have invented certain Improvements in Boxes for Ladies' Furs, of which the following is a specification, reference being had to the accompanying drawing, in which—

Figure 1:
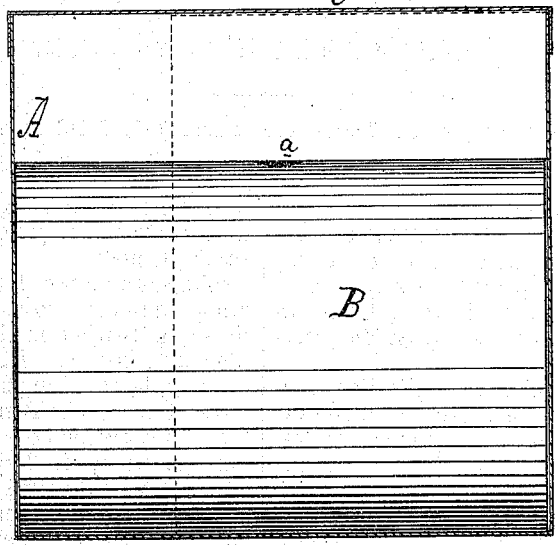
Figure 2:
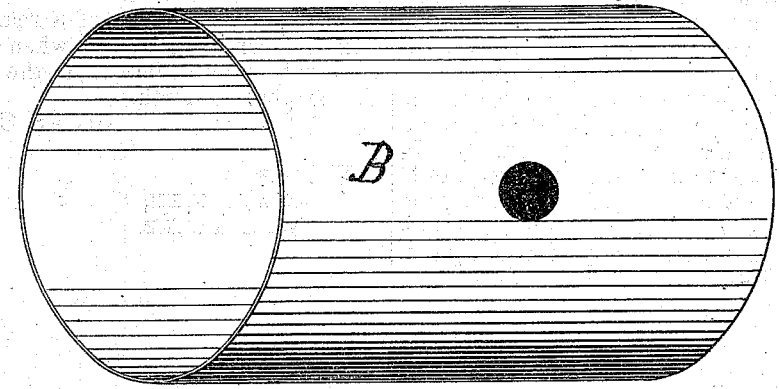

Figure 1 represents a vertical longitudinal section of a fur-box embodying my improvements; Fig. 2, a perspective view of the inner box removed from the outer one; and Fig. 3, a vertical transverse section taken through Fig. 1.

My invention consists in combining with a rectangular box of suitable dimensions, a tubular box open at both ends, and of a length sufficient to fit snugly between the ends and sides of the former box.

To enable those skilled in the art to make, construct, and use my invention, I will now proceed to describe it in detail.

By reference to the drawing it will be seen that my improved box is made in two parts, A and B, of which the outer one, A, is rectangular in form, and provided with a snugly-fitting cover, C, while the inner one, B, is cylindrical in form and tubular or hollow, and unprovided with a cover at either end; or, in other words, open at both ends. The inner box B is provided with an opening, *a*, on its side, at or near its longitudinal center, for the purpose of inserting a finger or a hand in order to raise it out of box A whenever required, and also for convenience in properly arranging the fur of the muff when being inserted within it. Instead of using the opening *a* for lifting the box B out of box A, a piece of tape or other suitable material may be secured to box B for the same purpose.

Figure 3:
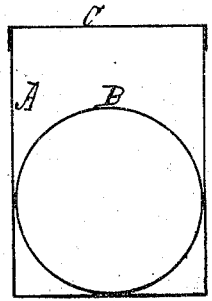

The tubular box B is made of a length and diameter sufficient to receive the muff without compressing it either on the sides or at its ends when placed in box A. The outer or rectangular box A is made of a length and width just sufficient to receive the box B and its inclosed muff. Figs. 1 and 3 represent the box B thus inclosed within box A, no muff, however, being represented. The length and width of the outer box being thus obtained, it is then made of a depth sufficient to receive the remainder of the furs which constitute the set between the upper side of the inclosed box B and the lid C of the outer box.

Both boxes may be made of any suitable material, but as a rule they will be made of pasteboard, and with a plain or ornamental finish. Thus made the box is not only compact and cheap, but very convenient for handling the furs.

Having described my invention, what I claim as new, and desire to secure by Letters Patent, is—

A fur-box, composed of a removable tubular box, B, open at both ends, when used in connection with an outer box, A, in the manner and for the purpose set forth.

SILAS C. NICHOLS.

Witnesses:
C. M. ALLEN,
W. A. LODER. (51.)